INVENTOR.
LUDGER E. LA BRIE
BY
ATTORNEY

Dec. 21, 1937.  L. E. LA BRIE  2,102,851
BRAKE
Filed March 27, 1935  6 Sheets-Sheet 2

INVENTOR.
LUDGER E. LA BRIE
BY
*Jn. W. McCaskey*
ATTORNEY

Dec. 21, 1937.    L. E. LA BRIE    2,102,851
BRAKE
Filed March 27, 1935    6 Sheets-Sheet 3

INVENTOR.
LUDGER E. LaBRIE
BY
ATTORNEY

Dec. 21, 1937.  L. E. LA BRIE  2,102,851
BRAKE
Filed March 27, 1935  6 Sheets-Sheet 4

INVENTOR.
LUDGER E. LA BRIE
BY
M. W. McConkey
ATTORNEY

Dec. 21, 1937.  L. E. LA BRIE  2,102,851
BRAKE
Filed March 27, 1935  6 Sheets-Sheet 5

INVENTOR.
LUDGER E. LA BRIE
BY
ATTORNEY

Dec. 21, 1937.  L. E. LA BRIE  2,102,851
BRAKE
Filed March 27, 1935   6 Sheets-Sheet 6

INVENTOR.
LUDGER E. LA BRIE
BY
M. W. McConkey
ATTORNEY

Patented Dec. 21, 1937

2,102,851

UNITED STATES PATENT OFFICE 2,102,851

BRAKE

Ludger E. La Brie, South Bend, Ind., assignor to Bendix Products Corporation, South Bend, Ind., a corporation of Indiana Application March 27, 1935, Serial No. 13,330

23 Claims. (Cl. 188—78)

This invention relates to brakes, and is illustrated as embodied in an internal expanding brake for an automobile.

An object of the invention is to provide a modified servo effect of one shoe on another, by transmitting to the other shoe a part only of the torque of the first shoe. The remainder of the torque of the first shoe is most conveniently transmitted to the brake backing plate or its equivalent, preferably by yielding means shown as including either non-metallic deformable material, such as rubber, or an equivalent spring construction. I prefer to utilize my invention in a brake of the type in which the action of the shoes is interchanged when the direction of drum rotation reverses, so that the brake is fully effective in both directions, and prefer also to make the spring or other yielding construction above referred to effective in both forward and reverse braking.

Several structural forms of the invention are shown in the drawings, each of which has certain subordinate advantages of its own. In some of these the shoes are connected by means acting on a non-metallic bushing, a coil spring or the like, or other yielding means engaging a fixed post carried by the backing plate, the yielding means therefore being in compression. In other embodiments the yielding material is in shear. In a number of the embodiments the connecting means between the shoes is made adjustable to compensate for wear.

Two principal forms of anchorage and applying means are shown adapted for use in the described brake. In one a fixed cylinder contains pistons acting (through novel adjustable thrust connections) to apply the shoes, and the pistons are arranged to transmit the braking torque of the shoes to the cylinder, which thus acts as an anchor. In the other, there is a separate anchor between the shoe ends, in the form of a fixed post mounted on the backing plate, and floating applying means acts on the shoe ends adjacent the anchor post.

An important feature of the invention relates to arranging the yielding means to distribute the torque of the unanchored shoe between the backing plate and the anchored shoe, in both forward and reverse braking.

The above and other objects and features of the invention, including various novel combinations of parts and desirable particular constructions, will be apparent from the following descriptions, will be apparent from the following description of the illustrative embodiments shown in the accompanying drawings, in which.

Figure 1:
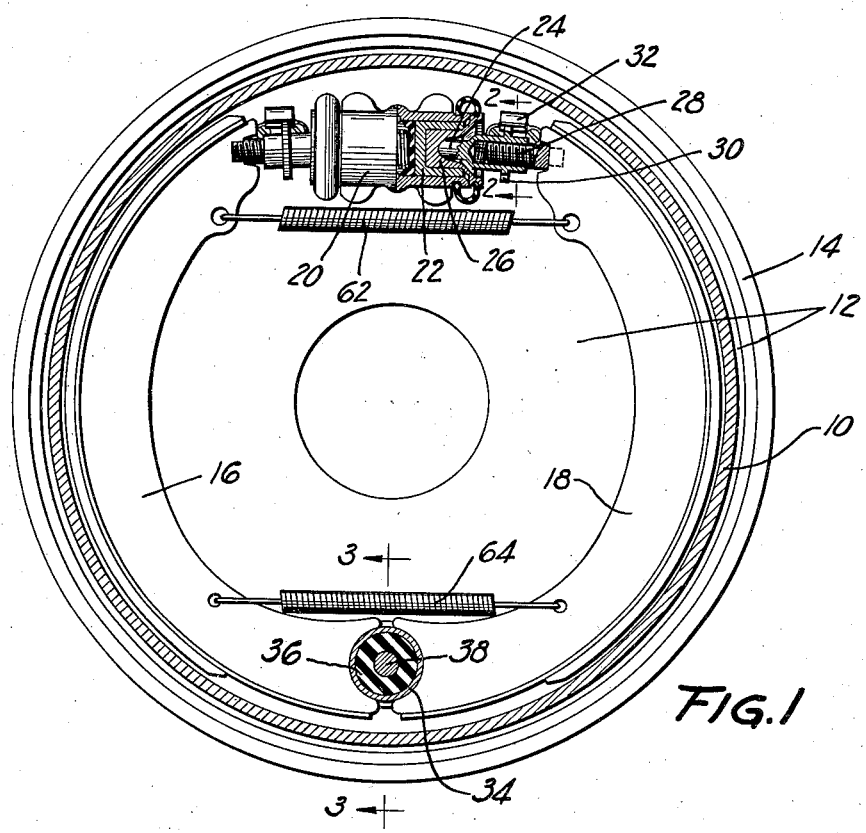
Figure 1 is a vertical section through the brake, just inside the head of the brake drum, and showing the brake shoes in side elevation.
Figure 2:
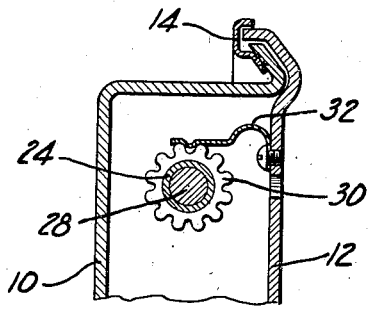
Figure 2 is a partial radial section on the line 2—2 of Figure 1, showing the brake adjustment.
Figure 3:
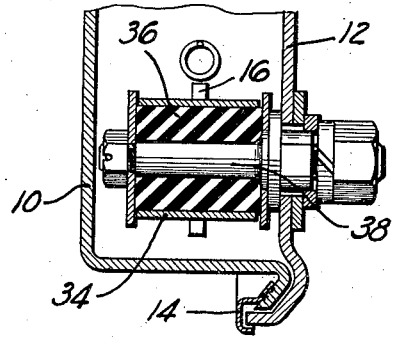
Figure 3 is a partial radial section on the line 3—3 of Figure 1, showing the yielding means acting on the connection between the shoes.

The brake illustrated in Figures 1, 2 and 3 comprises a rotatable drum 10, at the open side of which is a support such as a backing plate 12. The drum and plate have closely adjacent peripheral flanges, and the plate may have a baffle ring 14 encircling the edge of the peripheral flange of the drum, so that the drum and plate together form a substantially closed chamber housing the friction means of the brake.

In this illustrated embodiment of the invention, the friction means comprises two shoes 16 and 18. The present invention relates mainly to the problem of having one of these shoes react on the other with what is known as a "servo" action, and at the same time to limit that action to render it more controllable, especially but not necessarily in a brake of the illustrated type, in which the operation of the shoes is interchanged in forward and reverse braking.

In the brake illustrated in Figures 1, 2 and 3, the anchorage and applying means of the brake includes a hydraulic cylinder 20, illustrated as containing a pair of operating pistons 22, and which is rigidly and fixedly attached to the backing plate 12. These particular figures show the pistons 22 operatively connected to the respective shoes 16 and 18 by means such as thrust devices illustrated as including thrust parts 24 each pivotally (and universally) engaging one of the pistons 22, or an insert 26 seated in the piston, at one end, and formed with a threaded socket in its other end. A radial flange at the outer end of the insert 26 in each piston is adapted to bear against the respective end of the cylinder. The anchoring thrust exerted by whichever shoe is anchored is transmitted to the cylinder by this flange and thence to the backing plate.

Seated in the threaded socket of each of the parts 24, and adjustable relatively thereto, is (in this embodiment) a part 28 threaded into the socket at one end and notched to embrace the end of the web of shoe 16 or 18 at the other end. One of the parts 24 and 28 (as illustrated, the former) is provided with a notched collar 30, adapted for engagement with a screw driver or other tool, for adjustment of the effective length of the device 24—28, to adjust for wear of the brake. A leaf spring 32 attached to the backing plate, or the equivalent, may be provided to preserve the adjustments of the brake.

The principal features of the present invention relate to the means connecting the shoes 16 and 18 or their equivalents. In Figures 1, 2 and 3, this means includes a connecting cylindrical sleeve 34, seated in semi-cylindrical sockets in the adjacent lower ends of the webs of shoes 16 and 18. In this embodiment, the sleeve 34 encircles, and encloses and is in thrust engagement with, a bushing 36 or the like, of rubber or other non-metallic yielding material, which in turn encircles a post or auxiliary anchor 38 secured fixedly to the backing plate 12.

Preferably the resiliency of the material of the bushing 36 is so selected that approximately one-half of the braking torque of the shoe 16 (or, in reverse backing, of the shoe 18) is transmitted to the backing plate 12 through the bushing 36 or its equivalent.

The remainder (i. e. preferably approximately one-half) of the torque of the one shoe is transmitted directly to the other shoe through the sleeve 34 or its equivalent by what is known as a "servo" action, and tends to force said other shoe against the brake drum (10). Because of the limitation of this effect, it is much more controllable than in prior "servo" brakes, although less powerful, and, where accurate control is of more importance than maximum power, is a definite advantage.

Figure 4:
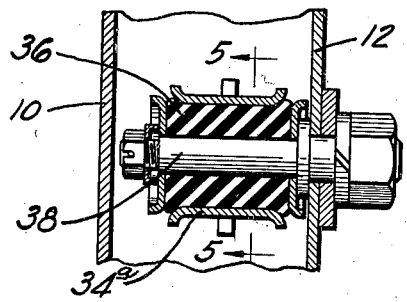
Figure 4 is a partial radial section corresponding to Figure 3, but showing a different form of yielding means.
Figure 5:
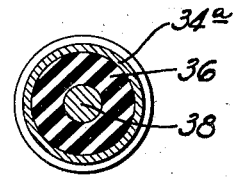
Figure 5 is a section through the connection of Figure 4, on the line 5—5 of that figure.

The arrangement of Figures 4 and 5 is the same as described above, except that clearances are provided about the sleeve 34ª, to facilitate the "flow" of the rubber or other non-metallic material of the bushing 36.

Figure 7:
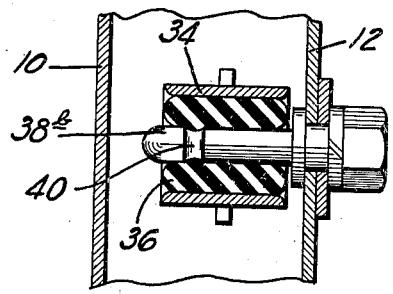
Figure 7 is a section corresponding to Figure 4, but showing another form of post.
Figure 6:
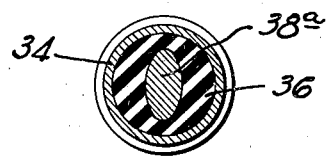
Figure 6 is a section corresponding to Figure 5, but showing a different shape of post carried by the backing plate.

In Figure 6, the post 38ª is oval in cross-section (instead of circular as in Figure 5), to facilitate the thrust action of the bushing 36 and permit the use of softer rubber. In Figure 7, the post 38ᵇ is provided with a groove 40 to interlock it with the non-metallic bushing 36.

Figure 9:
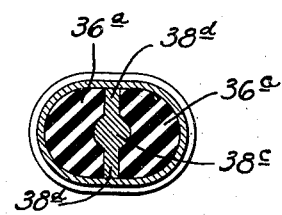
Figure 9 is a section corresponding to Figures 5 and 6, but on the line 9—9 of Figure 8.
Figure 8:
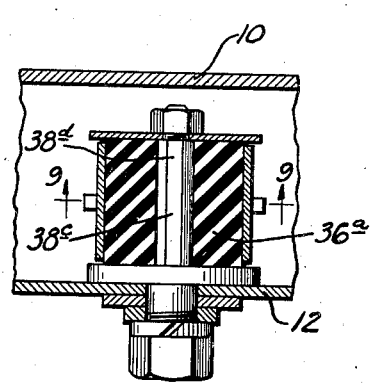
Figure 8 is a partial section, corresponding to the lower part of Figure 1, but showing a different shape of post.

In Figures 8 and 9, there is a fixed post 38ᶜ, with wings 38ᵈ, cooperating with two half-bushings 36ᵉ.

Figure 10:
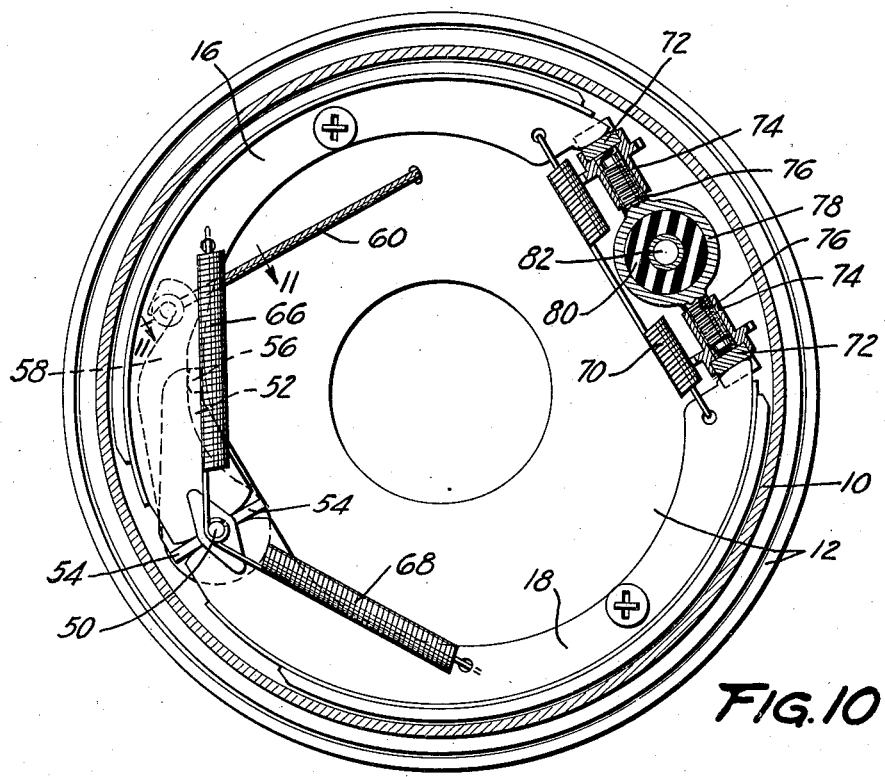
Figure 10 is a section corresponding to Figure 1, but showing a different embodiment.
Figure 11:
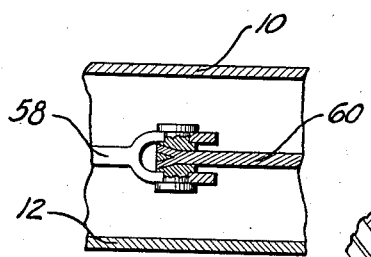
Figure 11 is a partial section on the line 11—11 of Figure 10.

In the embodiment of Figures 10 and 11, the anchorage and applying means includes an anchor post 50, secured to the backing plate 12 and arranged between the ends of the webs of the shoes 16 and 18, in combination with floating applying means such as a lever 52 (provided with thrust parts such as lugs 54 engaging the ends of the shoe webs).

The lever 52 is shown formed with a lateral thrust lug 56 engaged by the edge of an operating lever 58 pivoted on the anchor 50 and operated by means such as a tension cable 60 passing through the backing plate 12 and thence through a flexible Bowden conduit or the like.

The brake of Figures 1–3 has a return spring 62 tensioned between the shoes 16 and 18, and an auxiliary spring 64 tensioned between the lower ends of the shoes to hold them against the sleeve 34 encircling the bushing 36. The brake of Figure 10 has main and auxiliary springs 66 and 68 tensioned respectively between the shoes 16 and 18 and the anchor 50 (or other part carried by the backing plate 12), the spring 68 connected to the secondary shoe being stronger than the spring 66 connected to the primary shoe, together with an auxiliary spring 70 tensioned between the shoes at their connected ends.

In the brake of Figure 10, the ends of the shoe webs opposite the anchor 50 are seated in notches in parts 72 rotatably seated in cylindrical sockets in the ends of thrust parts 74, which have at their other ends sockets threaded adjustably to receive parts such as threaded stems 76 rigid (and if desired integral with) a sleeve 78 encircling and in compression engagement with a non-metallic bushing 80 of rubber material or the like which in turn encircles a post 82 fixedly mounted on the backing plate 12.

Figure 12:
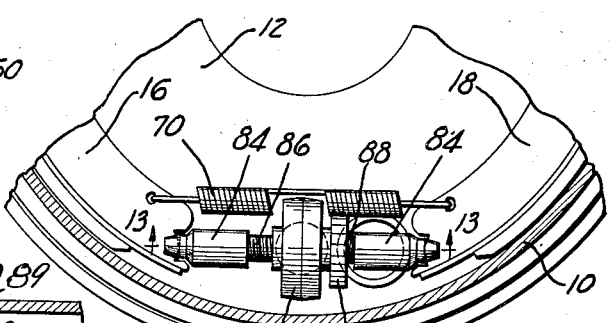
Figure 12 is a section corresponding to the lower part of Figure 1, but showing a different form of connecting means.
Figure 13:
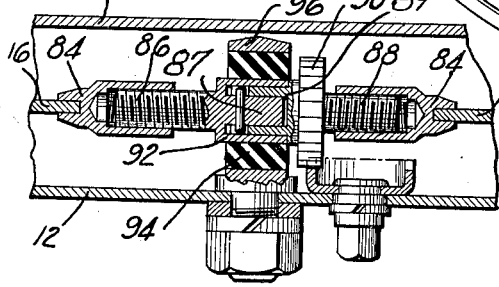
Figure 13 is a partial section on the line 13—13 of Figure 12.

In Figures 12 and 13, each shoe has a fitting 84 notched to embrace the end of the web, and formed with a socket into which is threaded a part 86 or 88, one of which has a toothed operating collar 90. These sockets are provided with interfitting cylindrical heads 87 and 89 which are keyed together to prevent relative turning. The outer one of these heads (89) is rotatably mounted in a cylindrical metallic sleeve 92 vulcanized or otherwise bonded to a non-metallic rubber bushing 94 similarly bonded into a sleeve 96 rigidly carried by the backing plate. Each of these heads is provided with an annular shoulder by means of which the thrust of the shoes is transmitted to the sleeve 92. The operation is as described above, except that the rubber is in shear instead of in compression.

Figure 14:
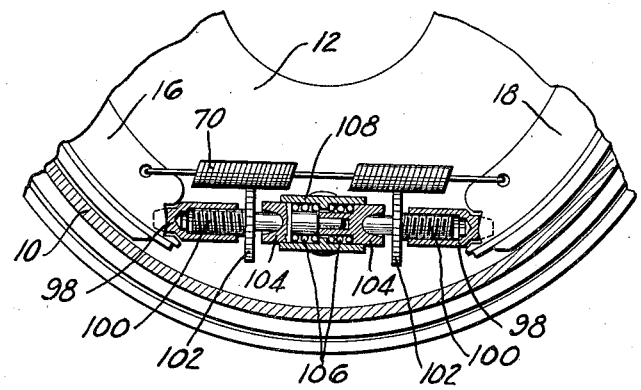
Figure 14 is a partial section corresponding to the lower portion of Figure 1, but showing a different connecting means.

In Figure 14, there are fittings 98 slotted to embrace the ends of the shoe webs, and formed with threaded sockets receiving parts 100 having toothed operating collars 102 and which have rounded ends seated in parts 104 having interfitting stems, and shouldered to engage coil springs 106 engaging opposite sides of an internal collar formed on a sleeve 108 bolted or otherwise secured to the backing plate.

Figure 16:
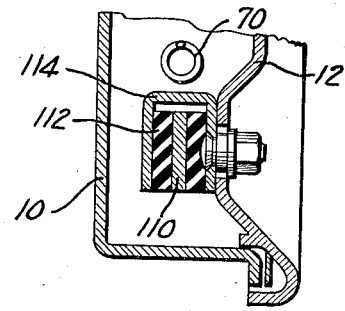
Figure 16 is a partial radial section on the line 16—16 of Figure 15.
Figure 15:
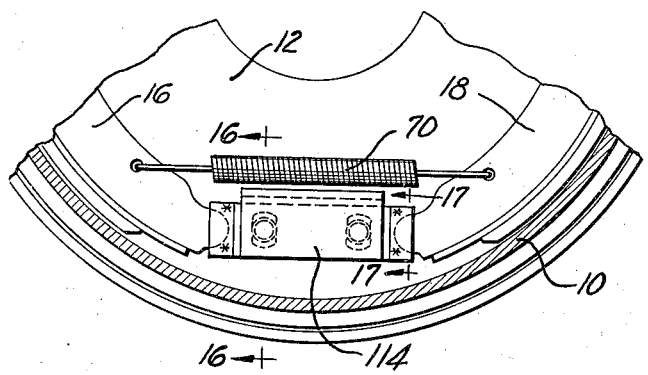
Figure 15 is a similar partial section showing still a different connecting means.
Figure 17:
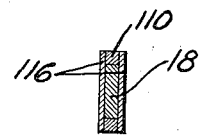
Figure 17 is a partial section on the line 17—17 of Figure 15.

In Figures 15, 16 and 17, the ends of the shoe webs are rounded to engage the opposite ends of a plate 110 vulcanized or otherwise bonded to two rubber blocks 112, the outer faces of which are similarly bonded to a U-shaped stamping 114 bolted or riveted to the backing plate. The plate 110 may have stampings 116 embracing the ends of the shoe webs.

Figure 18:
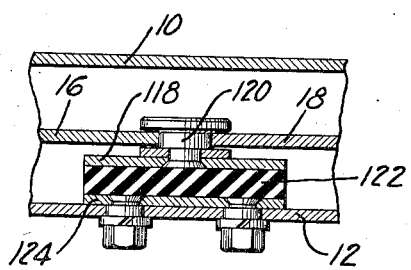
Figure 18 is a section corresponding to Figure 13, but showing the use of a block of non-metallic material in shear.

In Figure 18, a stamped plate 118 has riveted or otherwise secured thereto on one side a spool-shaped post 120 pivotally engaged by the adjacent ends of the shoe webs, and has vulcanized or otherwise bonded to its other side a block 122 of non-metallic material such as rubber. This block 122 is bonded on its opposite face to a plate 124 bolted or otherwise rigidly secured to the backing plate.

In Figures 16 and 18, it will be noted that the rubber is in shear and not in compression.

Figure 19:
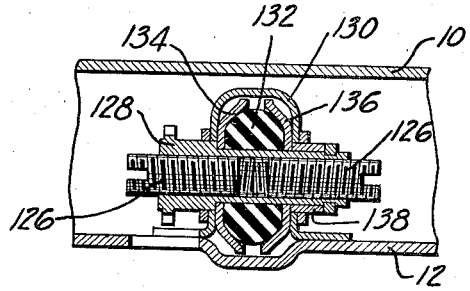
Figures 19 and 20 are similar sections, each showing a rubber block in compression.
Figure 20:
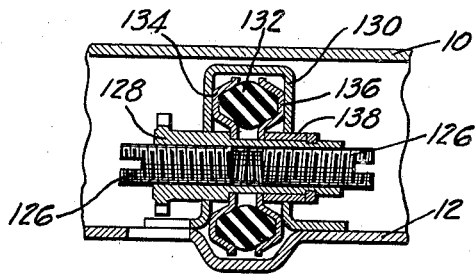

In Figure 19, each shoe web is seated in a notch in the end of a fitting 126 threaded into a right-and-left threaded socket 128 having a toothed collar by which it may be turned. The socket 128 has freely sleeved thereon a housing 130 fixed on the backing plate, and which contains a rubber bushing 132 embraced between two washers 134 and 136 engaged respectively by a shoulder on the socket 128 and by a sleeve 138 fixed on the socket. The arrangement of Figure 20 differs from that of Figure 19 only in the shape and dimensions of the parts.

Figure 21:
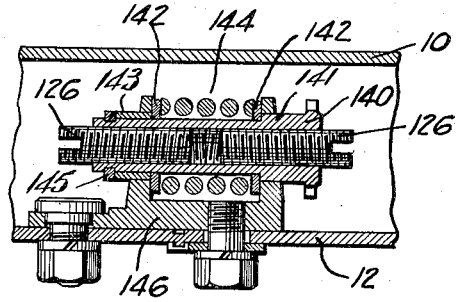
Figure 21 is a similar section illustrating one way of utilizing a coil spring.

In Figure 21, the fittings 126 are threaded into a right-and-left threaded socket 140 having rigid therewith two collars (one 141 shown integral therewith and the other a sleeve 143 held by a snap ring 145 seated in an annular groove) engaging washers 142 at the opposite ends of a coil spring 144 adapted to be held against braking torque by a fitting 146 bolted or otherwise fixed to the backing plate. Shoe thrust is transmitted to the members 126 is transmitted to member 140, and through either the collar 141 or sleeve 143 to the washers 142. As the member 140 is forced in either direction, the spring is compressed. The force of the spring is absorbed by the backing plate through member 146 and the rest of the shoe thrust is transmitted through member 140 to apply the opposite shoe.

Figure 22:
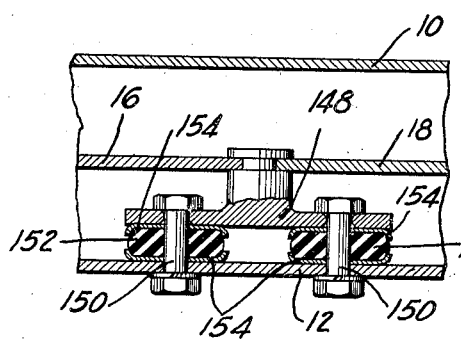
Figure 22 is a similar section showing one arrangement for two rubber blocks.

In Figure 22, the shoe webs are notched to embrace a projection from a plate 148 having openings rounded to embrace posts 150 passing through rubber bushings 152 embraced between washers 154. Posts 150 are rigid with the backing plate. Cocking of the plate 148 applies pressure to one or the other of the bushings 152.

Figure 23:
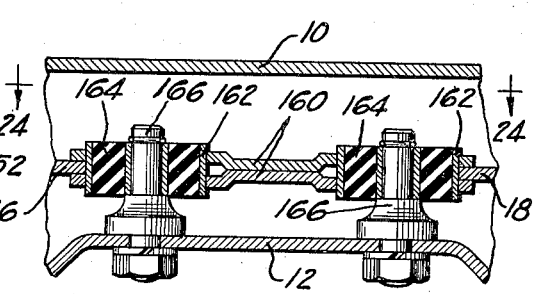
Figure 23 is a similar section showing how the load may be divided between two rubber blocks, both in compression.
Figure 24:
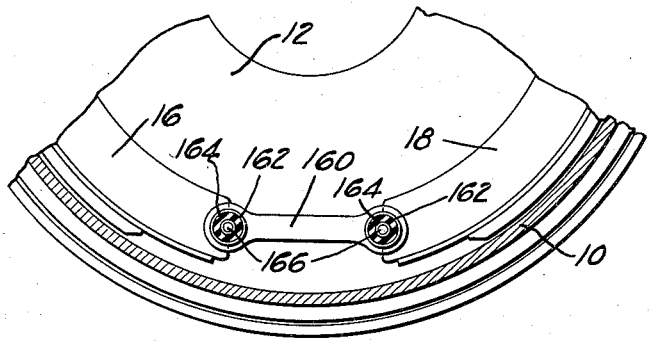
Figure 24 is a partial section on the line 24—24 of Figure 23.

In Figures 23 and 24, the shoes are connected by stampings 160 having parts encircling steel sleeves 162 containing two rubber bushings 164 which encircle and embrace posts 166 fixed on the backing plate, thus dividing the action between two bushings.

Figure 25:
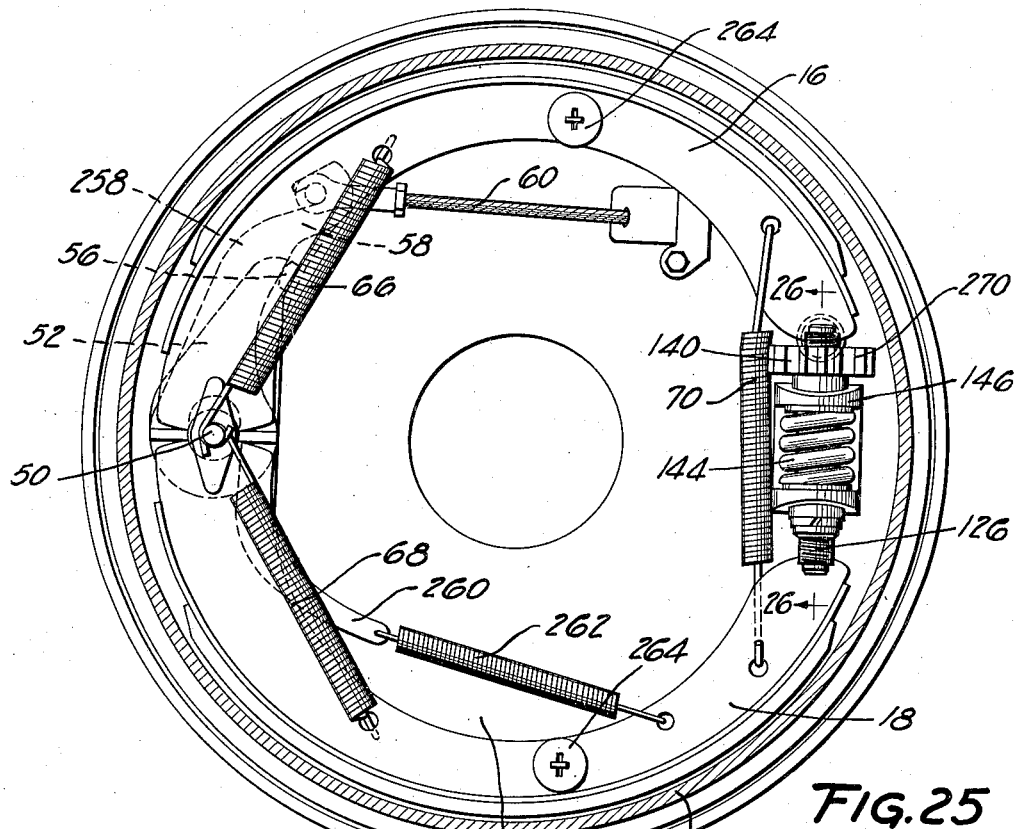
Figure 25 is a vertical section corresponding to Figure 1, but showing still another embodiment of the invention.
Figure 26:
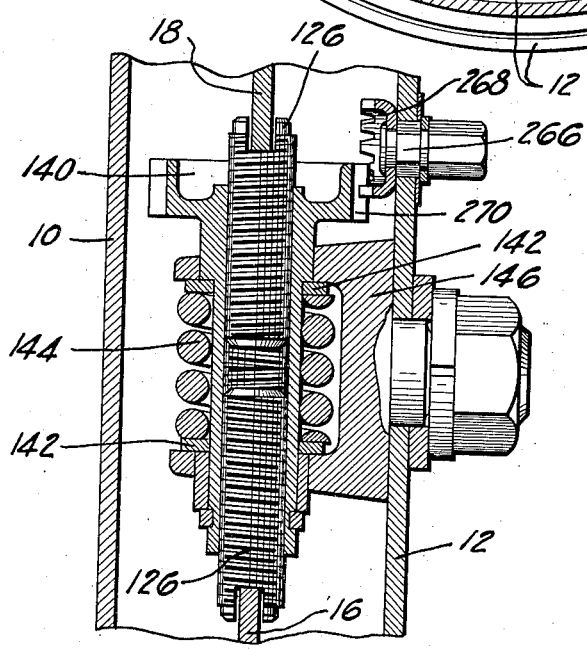
Figure 26 is a partial section on the line 26—26 of Figure 25.

The brake of Figures 25 and 26 has applying means substantially like that of Figure 10, except that the lever 258 (which corresponds to lever 58 and which is pivotally mounted on the anchor 50) has a lower extension 260 having a tensioned coil return spring 262 connecting it to the backing plate. The shoes of this brake have conventional spring steady rests 264.

The means connecting the shoes of this brake is substantially the same as shown in Figure 21, except for the addition of a short shaft 266 passing through the backing plate and having a non-circular outer end adapted to be gripped by a wrench or other operating tool, and which has inside the brake a crown gear 268 meshing with elongated pinion teeth 270 formed on the end of the socket 140.

Shaft 266 can be turned to operate the right-and-left threaded socket 140 to adjust the connection, while the length of teeth 270 is such that they slide idly on the teeth of crown gear 268 in the ordinary operation of the brake, without becoming disengaged therefrom. The spring 70 engages teeth 270, yieldingly to lock the socket 140 in adjusted position.

While a number of illustrative embodiments have been described in detail, it is not my intention to limit the scope of my invention to those particular embodiments or otherwise than by the terms of the appended claims.

This application is a continuation in part of an application filed February 18, 1935, Serial No. 6,982.

I claim:

1. A brake comprising shoes having fixed anchorage means and circumferentially floating applying means at one side of the brake, and having connecting means at the other side of the brake, in combination with yielding means acting on said connecting means and which is heavy enough to take approximately one-half of the torque of one shoe and which transmits the remaining half of the torque of said one shoe to the other shoe with a servo effect.

2. A brake comprising shoes having anchorage and applying means at one side of the brake, and having connecting means at the other side of the brake, in combination with thrust means of deformable non-metallic material acting on said connecting means and taking part of the torque of one shoe and permitting the transmission of the remaining torque of said one shoe to the other shoe with a servo effect.

3. A brake comprising a drum and a backing plate and shoes having fixed anchorage means and circumferentially floating applying means carried by the backing plate at one side of the brake, and having connecting means at the other side of the brake, in combination with yielding means connected to the backing plate and acting on said connecting means and which is heavy enough to transmit to the backing plate approximately one-half of the torque of one shoe and which transmits the remaining half of the torque of said one shoe to the other shoe with a servo effect.

4. A brake comprising a drum and a backing plate and shoes having anchorage and applying means carried by the backing plate at one side of the brake, and having connecting means at the other side of the brake, in combination with thrust means of deformable non-metallic material connected to the backing plate and acting on said connecting means and transmitting to the backing plate part of the torque of one shoe and permitting the transmission of the remaining torque of said one shoe to the other shoe with a servo effect.

5. A brake comprising a drum and a backing plate and shoes having fixed anchorage means and circumferentially floating applying means carried by the backing plate at one side of the brake, and having connecting means at the other side of the brake, in combination with yielding means connected to the backing plate and acting on said connecting means and which is heavy enough to transmit to the backing plate approximately one-half of the torque of one shoe and which transmits the remaining half of the torque of said one shoe to the other shoe with a servo effect, said brake being so constructed and arranged that when the drum is turning in one direction one shoe acts as described on the other shoe, and when the drum is turning in the other direction said other shoe acts as described on said one shoe.

6. A brake comprising a drum and a backing plate and shoes having anchorage and applying means carried by the backing plate at one side of the brake, and having connecting means at the other side of the brake, in combination with thrust means of deformable non-metallic material connected to the backing plate and acting on said connecting means and transmitting to the backing plate part of the torque of one shoe and permitting the transmission of the remaining torque of said one shoe to the other shoe with a servo effect, said brake being so constructed and arranged that when the drum is turning in one direction one shoe acts as described on the other shoe, and when the drum is turning in the other direction said other shoe acts as described on said one shoe.

7. A brake comprising shoes having anchorage and applying means at one side of the brake, and having connecting means at the other side of the brake, in combination with yielding means acting on said connecting means and taking part of the torque of one shoe and permitting the transmission of the remaining torque of said one shoe to the other shoe with a servo effect, said yielding means comprising a fixed part and non-metallic material interposed between said fixed part and said connecting means.

8. A brake comprising a drum and a backing plate and shoes having anchorage and applying means carried by the backing plate at one side of the brake, and having connecting means at the other side of the brake, in combination with yielding means connected to the backing plate and acting on said connecting means and transmitting to the backing plate part of the torque of one shoe and permitting the transmission of the remaining torque of said one shoe to the other shoe with a servo effect, said yielding means comprising a fixed part carried by the backing plate and non-metalic material interposed between said fixed part and said connecting means.

9. A brake comprising a drum and a backing plate and shoes having anchorage and applying means carried by the backing plate at one side of the brake, and having connecting means at the other side of the brake, in combination with yielding means connected to the backing plate and acting on said connecting means and transmitting to the backing plate part of the torque of one shoe and permitting the transmission of the remaining torque of said one shoe to the other shoe with a servo effect, said yielding means comprising a fixed post carried by the backing plate and said yielding means comprising non-metallic material on opposite sides of said post, and said connecting means having a sleeve encircling said material.

10. A brake comprising a drum and a backing plate and shoes having anchorage and applying means carried by the backing plate at one side of the brake, and having connecting means at the other side of the brake, in combination with yielding means connected to the backing plate and acting on said connecting means and transmitting to the backing plate part of the torque of one shoe and permitting the transmission of the remaining torque of said one shoe to the other shoe with a servo effect, said yielding means comprising a non-metallic part carried by the backing plate and acted on in shear by said connecting means.

11. A brake comprising a drum and a backing plate and shoes having anchorage and applying means carried by the backing plate at one side of the brake, and having connecting means at the other side of the brake, in combination with yielding means connected to the backing plate and sleeved about the connecting means and acting on said connecting means and transmitting to the backing plate part of the torque of one shoe and permitting the transmission of the remaining torque of said one shoe to the other shoe with a servo effect, said connecting means being adjustable to compensate for wear of the brake, without substantially affecting the action of said yielding means.

12. A brake comprising a drum and a backing plate and shoes having anchorage and applying means carried by the backing plate at one side of the brake, and having connecting means at the other side of the brake, in combination with yielding means connected to the backing plate and acting on said connecting means and transmitting to the backing plate part of the torque of one shoe and permitting the transmission of the remaining torque of said one shoe to the other shoe with a servo effect, said yielding means comprising a fixed post carried by the backing plate and said yielding means comprising non-metallic material on opposite sides of said post, and said connecting means having a sleeve encircling said material, said connecting means being adjustable to compensate for wear of the brake, without substantially affecting the action of said yielding means.

13. A brake comprising a drum and a backing plate and shoes having anchorage and applying means carried by the backing plate at one side of the brake, and having connecting means at the other side of the brake, in combination with yielding means connected to the backing plate and acting on said connecting means and transmitting to the backing plate part of the torque of one shoe and permitting the transmission of the remaining torque of said one shoe to the other shoe with a servo effect, said yielding means comprising a non-metallic part carried by the backing plate and acted on in shear by said connecting means, said connecting means being adjustable to compensate for wear of the brake, without substantially affecting the action of said yielding means.

14. A brake comprising shoes having anchorage and applying means at one side of the brake, and having connecting means at the other side of the brake, in combination with yielding means acting on said connecting means and taking part of the torque of one shoe and permitting the transmission of the remaining torque of said one shoe to the other shoe with a servo effect, said anchorage and applying means comprising a fixed cylinder and pistons acting to apply the shoes and also acting to transmit the braking torque of the shoes to said cylinder.

15. A brake comprising shoes having anchorage and applying means at one side of the brake, and having connecting means at the other side of the brake, in combination with yielding means acting on said connecting means and taking part of the torque of one shoe and permitting the transmission of the remaining torque of said one shoe to the other shoe with a servo effect, said anchorage and applying means comprising a fixed anchor between the shoe ends and a floating applying device acting on the shoe ends adjacent said anchor.

16. A brake-shoe connecting device comprising a thrust part adjustable as to its length and encircled by a non-metallic bushing resisting its movement in either direction, and a fixed part encircling and holding said bushing.

17. A brake-shoe connecting device comprising a thrust part encircled by a non-metallic bushing resisting its movement, and a fixed part encircling and holding said bushing.

18. A brake comprising shoes having anchorage and applying means at one side of the brake, and having connecting means at the other side of the brake, in combination with thrust means including a coil spring in compression acting on said connecting means and taking part of the torque of one shoe and permitting the transmission of the remaining torque of said one shoe to the other shoe with a servo effect, said connecting means being arranged within the coil spring and being adjustable to compensate for wear of the shoes.

19. A brake comprising a drum and a backing plate and shoes having anchorage and applying means carried by the backing plate at one side of the brake and one of which anchors in one direction of drum rotation and the other of which anchors in the other direction of drum rotation, and having connecting means at the other side of the brake, in combination with yielding means of the brake, connected to the backing plate and acting on said connecting means and transmitting to the backing plate part of the torque of one shoe and permitting the transmission of the remaining torque of said one shoe to the other shoe with a servo effect, said yielding means comprising a coil spring in compression between the backing plate and the unanchored shoe in both directions of drum rotation, said compression coil spring being heavy enough to take approximately half the thrust of the unanchored shoe.

20. A brake comprising a drum and a backing plate and shoes having fixed anchorage means and circumferentially floating applying means carried by the backing plate at one side of the brake and one of which anchors in one direction of drum rotation and the other of which anchors in the other direction of drum rotation, and having connecting means at the other side of the brake, in combination with yielding means connected to the backing plate and acting on said connecting means and in both directions of drum rotation transmitting to the backing plate approximately one-half of the torque of one shoe and permitting the transmission of the remaining torque of said one shoe to the other shoe with a servo effect.

21. A brake comprising a drum and a backing plate and shoes having anchorage and applying means carried by the backing plate at one side of the brake, and having connecting means at the other side of the brake, in combination with thrust means including a coil spring in compression relatively to the backing plate and acting on said connecting means and transmitting to the backing plate approximately one-half of the torque of one shoe and permitting the transmission of the remaining torque of said one shoe to the other shoe with a servo effect.

22. A brake comprising a drum and a backing plate and shoes having anchorage and applying means carried by the backing plate at one side of the brake, and having connecting means at the other side of the brake, in combination with thrust means including a coil spring in compression relatively to the backing plate and acting on said connecting means and transmitting to the backing plate approximately one-half of the torque of one shoe and permitting the transmission of the remaining torque of said one shoe to the other shoe with a servo effect, said brake being so constructed and arranged that when the drum is turning in one direction one shoe acts as described on the other shoe, and when the drum is turning in the other direction said other shoe acts as described on said one shoe.

23. A brake comprising shoes having anchorage and applying means at one side of the brake and one of which anchors in forward braking and the other of which anchors in reverse braking, and having connecting means at the other side of the brake, in combination with yielding means acting on said connecting means and taking part of the torque of one shoe and permitting the transmission of the remaining torque of said one shoe to the other shoe with a servo effect, said yielding means comprising spaced fixed parts and a coil spring in compression between one of said fixed parts and the unanchored shoe in both forward and reverse braking.

LUDGER E. LA BRIE.